(12) United States Patent
Uh

(10) Patent No.: US 7,427,454 B2
(45) Date of Patent: Sep. 23, 2008

(54) SECONDARY BATTERY

(75) Inventor: Hwail Uh, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 11/692,407

(22) Filed: Mar. 28, 2007

(65) Prior Publication Data

US 2007/0232123 A1  Oct. 4, 2007

(30) Foreign Application Priority Data

Mar. 28, 2006  (KR) ...................... 10-2006-0027948

(51) Int. Cl.
*H01M 2/08* (2006.01)

(52) U.S. Cl. ...................... 429/174; 439/500

(58) Field of Classification Search ................ 429/174, 429/180–183, 185; 439/500
See application file for complete search history.

(56) References Cited

U.S. PATENT DOCUMENTS

2006/0093907 A1  5/2006  Jeon et al.

FOREIGN PATENT DOCUMENTS

| JP | 2000-30690 | 1/2000 |
|----|------------|--------|
| KR | 2002-62217 | 7/2002 |
| KR | 2002-86228 | 11/2002 |
| KR | 2003-81639 | 10/2003 |
| KR | 2006-27267 | 3/2006 |

*Primary Examiner*—Khiem Nguyen
(74) *Attorney, Agent, or Firm*—Stein, McEwen & Bui, LLP

(57) ABSTRACT

A secondary battery includes an insulation case that is thickly formed to prevent deformation and that includes a recess that receives at least a part of a cap assembly in the insulation case so as minimize unnecessary space between the cap assembly and the insulation case.

9 Claims, 3 Drawing Sheets

SECONDARY BATTERY

CROSS-REFERENCE TO RELATED APPLICATION

This application claims the benefit of Korean Application No. 2006-27948 filed Mar. 28, 2006, in the Korean Intellectual Property Office, the disclosure of which is incorporated herein by reference.

BACKGROUND OF THE INVENTION

1. Field of the Invention

Aspects of the present invention relate to a secondary battery, and more particularly, to a secondary battery in which deformation of the insulation case can be prevented by forming the case thickly and in which unnecessary space between a cap assembly and the insulation case can be minimized by forming a recess that can receive at least a part of the cap assembly in the insulation case so as to maximize the capacity or minimize the size of the battery.

2. Description of the Related Art

Generally, the term "secondary battery" refers to a battery that can be recharged or discharged, as opposed to a disposable battery, which cannot be recharged. Secondary batteries have been used in many types of electronic devices including cellular phones, notebook computers, and camcorders. A lithium-ion battery has an operational voltage of 3.6V, which is three times higher than that of an Ni—Cd battery or an Ni—H battery and has a high energy density per unit weight. Therefore, lithium-ion batteries have been rapidly developed and are frequently used as power sources for electronic devices.

The lithium-ion battery uses lithium oxides as the cathode active material and a carbon material as the anode active material. Lithium-ion batteries are produced as various types, such as a cylindrical type, a rectangular type and a pouch type.

A rectangular secondary battery has an electrode assembly, a can that receives the electrode assembly and a cap assembly connected to the can. The electrode assembly includes a cathode, an anode, a separator interposed between the cathode and the anode and a cathode tab and anode tab extending from the cathode and the anode respectively. The can is a receptacle of a roughly rectangular shape, made of metal and is formed by a process such as deep drawing.

The can includes a closed end and an open end through which the electrode assembly is inserted in the fabrication of the battery. For convenience and clarity herein, the terms "bottom" and "lower" refer generally to a direction towards the closed end of the can and the terms "top" and "upper" refer generally to a direction away from the closed end of the can.

The cap assembly includes a cap plate connected to the upper part of the can, an electrode terminal installed through a terminal hole and having a gasket located on its outer face that insulates the electrode terminal from the cap plate, an insulation plate installed on the lower face of the cap plate, and a terminal plate installed on the lower face of the insulation plate and electrically contacting the electrode terminal.

The anode of the electrode assembly is electrically coupled to the electrode terminal through the anode tab and the terminal plate, and the cathode is electrically coupled to the cap plate through the cathode tab.

The rectangular secondary battery may further include an insulation case installed in the lower part of the terminal plate. The insulation case provides insulation between the electrode assembly and the cap assembly. The insulation case includes a plate that forms a base and a side wall that extends upwardly at the edge of the plate. The plate may include a slot through which the anode tab passes, a side groove formed on the side of the plate through which the cathode tab passes, a hole through which an electrolytic solution is injected, and a vent that allows gas generated inside the battery to escape.

However, the conventional insulation case has following problems. If, in an effort to maximize the size of the electrode assembly and therefore increase the capacity of the battery, the plate that makes up the base of the insulator case is formed too thin, it becomes more difficult to efficiently insert the insulation case inside the can because of deformation of the insulation case that can occur during injection molding of the insulation case. If the height of side wall is low, the insulation case may be easily deformed by external forces such as twisting, even after the insulation case is inserted in the can.

On the other hand, if the plate forming the base is made thick, it is possible to prevent the deformation of the insulation case, but the capacity of the battery is reduced because the size of the electrode assembly must be reduced to accommodate the thicker base.

SUMMARY OF THE INVENTION

Aspects of the invention provide a secondary battery in which deformation of an insulation case is prevented by forming the case thickly and in which unnecessary space between a cap assembly and the insulation case is minimized by forming a recess that receives a part of a cap assembly in the insulation case so as to maximize the capacity or minimize the size of the battery.

According to an embodiment of the present invention, a secondary battery, which includes, an electrode assembly including first and second electrodes and a separator that is interposed between the first and second electrodes; a can that contains the electrode assembly and that has a closed end and an open end; a cap assembly connected to the open end of the can, wherein the cap assembly includes a lower projected part; and an insulation case is installed between the electrode assembly and the cap assembly, wherein the insulation case includes a first recess that receives at least a portion of the lower projected part of the cap assembly.

According to an aspect of the present invention, the insulation case includes a plate portion forming a base part and a side wall extended upwardly at the edge of the plate. The first recess may be formed on the upper face of the plate.

According to an aspect of the present invention, the cap assembly comprises a cap plate connected to the upper part of the can and provided with a terminal hole, an electrode terminal installed through the terminal hole and having a gasket located on its outer face that insulates the electrode terminal from the cap plate, a terminal plate installed below the cap plate and connected to the lower end of the electrode terminal and an insulation plate installed between the cap plate and the terminal plate, and wherein the lower projected part of the cap plate received in the first recess is a first portion of the terminal plate.

According to an aspect of the present invention, the inside of the first recess is stepped to have an upper step and a lower step and wherein the upper step of the first recess receives the first portion of the terminal plate and the lower step of the first recess receives the lower end of the electrode terminal.

According to an aspect of the present invention, a lower face of the cap plate includes a first seat recess that seats a first portion of the insulation plate and wherein a lower face of the insulation plate includes a second seat recess that seats a second portion of the terminal plate and wherein the second seat recess aligns with the first seat recess.

According to an aspect of the present invention, a space is provided between second portion of the terminal plate seated in the second seat recess and the upper face of the plate portion of the insulation case, wherein a first electrode tab extends from the first electrode of the electrode assembly, wherein the insulation case includes a slot, wherein the first electrode tab passes through the slot in the plate portion of the insulation case and extends into the space provided between the insulation case and the second portion of the terminal plate and wherein the first electrode tab is welded to the lower face of the terminal plate.

According to an aspect of the present invention, the upper face of the insulation case includes a second recess that provides the space between the second portion of the terminal plate and the upper face of the plate portion of the insulation case into which the first electrode tab extends.

According to an aspect of the present invention, a space is provided between the lower face of the cap plate and the upper face of the plate portion of the insulation case at a side that is opposite to the side provided with the first seat recess, on the basis of the electrode terminal, wherein a second electrode tab extends from the second electrode of the electrode assembly, wherein the insulation case includes a side recess, wherein the second electrode tab passes through the side recess of the insulation case and extends into the space provided between the lower face of the cap plate and the upper face of the plate portion of the insulation case, and wherein the second electrode tab is welded to the lower face of the cap plate.

According to an aspect of the present invention, the upper face of the side wall part of the insulation case contacts the lower face of the cap plate.

According to another embodiment of the present invention, a secondary battery includes an electrode assembly including first and second electrodes, first and second electrode tabs extending from the first and second electrodes, respectively, and a separator interposed between the first electrode and the second electrode; a can that contains the electrode assembly; and a cap assembly including a cap plate connected to the upper part of the can and provided with a terminal hole, an electrode terminal that extends through the terminal hole, a gasket that insulates the electrode terminal from the cap plate, a terminal plate installed under the cap plate and connected to the lower end of the electrode terminal and an insulation plate installed between the cap plate and the terminal plate. According to an embodiment of the present invention, an insulation case is installed between the electrode assembly and the cap assembly. The insulation case includes a slot through which the first electrode tab passes, a side groove through which the second electrode tab passes a first recess that receives the that provides a space that receives the first electrode tab, the first electrode tab being welded to the lower face of the terminal plate, and a third recess that provides a space that receives the second electrode tab, the second electrode tab being welded to the lower face of the cap plate.

According to an embodiment of the present invention, the upper face of the insulation case may contact the lower face of the cap plate.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
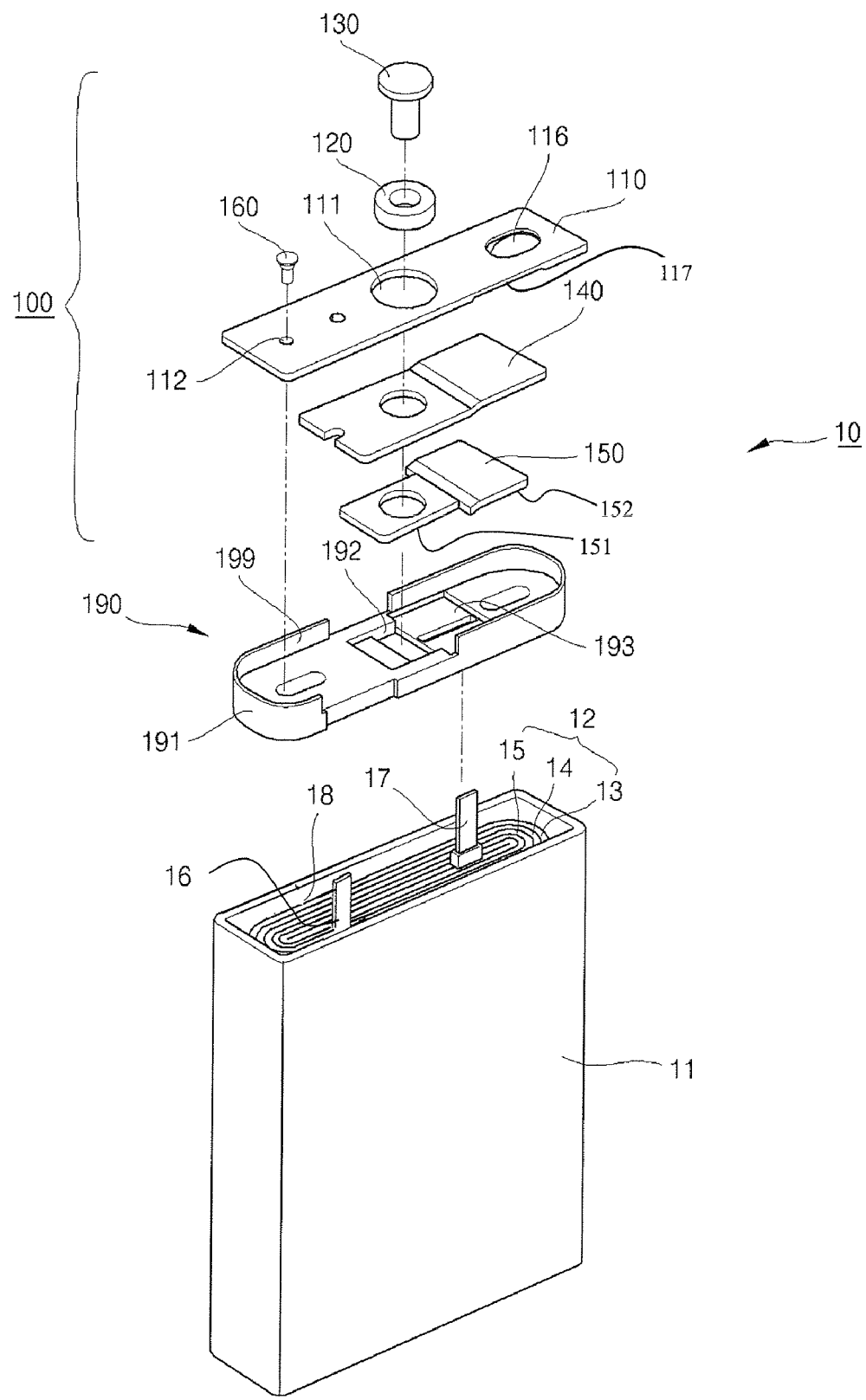
FIG. 1 is an exploded perspective view illustrating a secondary battery according to one embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is an exploded perspective view illustrating a secondary battery according to an embodiment of the present invention.

Referring to FIG. 1, the secondary battery 10 includes an electrode assembly 12, a can 11 that receives the electrode assembly 12, a cap assembly 100 connected to the can 11 and an insulation case 190 that provides insulation between the cap assembly 100 and the electrode assembly 12.

The electrode assembly 12 is generally formed in a jelly roll configuration by forming a cathode 13 and an anode 15 as wide plates to increase the electric capacity. A separator 14 is interposed between the cathode 13 and the anode 15 to insulate the cathode from the anode and the assembly is wound. The anode 15 may be formed, for example, by coating a collector formed of Cu foil with carbon as the anode active material. The cathode 13 may be formed, for example, by coating a collector formed of Al foil with lithium cobalt oxide as the cathode active material. The separator 14 may be formed, for example, of polyethylene, polypropylene or a co-polymer of polyethylene and polypropylene. The separator 14 is formed to be wider than the width of the cathode 13 and the anode 15 in order to prevent a short circuit between pole plates. A cathode tab 16 and an anode tab 17 are connected to each electrode and extend from the electrode assembly 12. Insulation tape 18 is wound around the cathode tab 16 and the anode tab 17 where each extends from the electrode assembly 12 to prevent a short circuit between pole plates 13 and 15.

The can 11 of a rectangular secondary battery 10 is a roughly rectangular parallelepiped receptacle made of metal as shown in FIG. 1. The can 11 is formed by a process such as deep drawing. Therefore, it is possible for the can 11 itself to function as a terminal. It is desirable, but not required, that the material of the can be a lightweight conductive metal such as Al or Al alloy. The can 11 serves as a receptacle for the electrode assembly and an electrolytic solution, and the upper end is sealed off by the cap assembly 100. It is to be understood that the can 11 can be formed using other materials and by other methods used to mold a shape.

The cap assembly 100 includes a cap plate 110, an electrode terminal 130, an insulation plate 140 and a terminal plate 150. A terminal hole 111 is formed in the cap plate 110, and the electrode terminal 130 is installed through the terminal hole 111. A gasket 120 surrounds the outer face of the electrode terminal 130 to insulate the electrode terminal 130 from the cap plate 110. The insulation plate 140 is installed on the lower face of the cap plate 110. The terminal plate 150 is installed on the lower face of the insulation plate 140. The lower end of the electrode terminal 130 is connected to the terminal plate 150.

The anode 15 of the electrode assembly 12 is electrically coupled to the electrode terminal 130 via the anode tab 17 and the terminal plate 150. The cathode 13 of the electrode assembly 12 is electrically connected to the cap plate 110 via the cathode tab 16, which is welded to the cap plate 110. Although in the embodiment described herein, the anode 15 is electrically coupled to the electrode terminal 130 and the cathode 13 is electrically connected to the cap plate 110, it is to be understood that a battery according to aspects of the present invention may be designed to have the opposite polarity. Therefore, the anode and cathode electrodes and electrode tabs will be referred to herein non-specifically as the "first electrode," "first electrode tab," "second electrode" and the "second electrode tab."

The insulation case 190 is installed to receive the lower part of the terminal plate 150 so as to insulate the cap assembly 100 from the electrode assembly 12, as will be described below.

A vent 116 is formed on a side of the cap plate 110. The vent 116 ensures the safety of the battery by emitting internally generated gas when the internal pressure of the battery rises due to an overcharge. The vent is thinner than other parts of the cap assembly 110 and breaks down to emit the internally generated gas when the internal pressure rises above a predetermined limit. An electrolytic solution feeding hole 112 is formed on the other side of the cap plate 110 to feed an electrolytic solution into the can 11. However, it is to be understood that the vent and the feeding hole can be otherwise disposed on the battery.

Hereinafter, the shape of the insulation case 190 will be described in detail.

Figure 2:
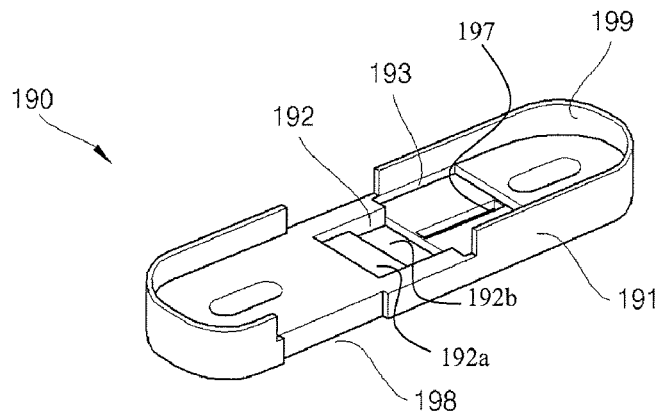
FIG. 2 is a perspective view illustrating the insulation case of the secondary battery according to FIG. 1.
Figure 3:
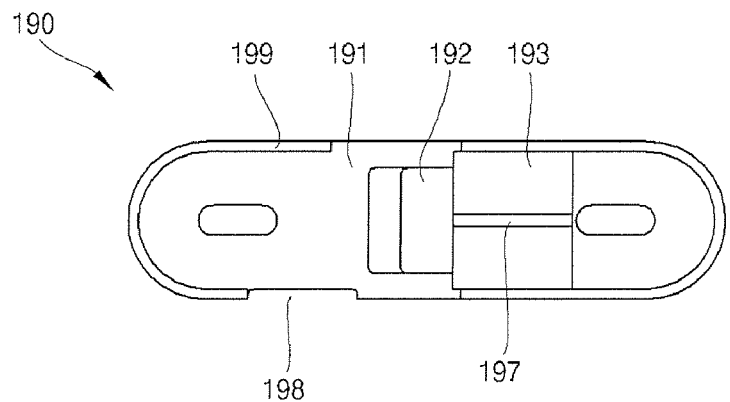
FIG. 3 is a plane view illustrating the insulation case of FIG. 2.
Figure 4:
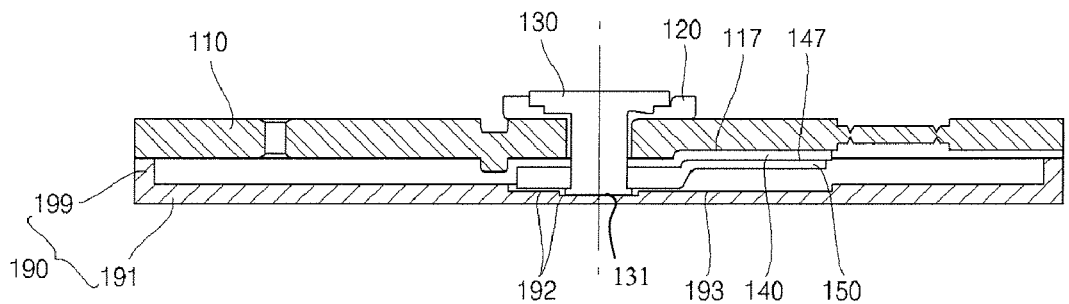
FIG. 4 is a sectional view illustrating a cap assembly to which the insulation case of FIG. 2 is applied.

FIG. 2 is a perspective view of the insulation case of the secondary battery according to one embodiment of the present invention, FIG. 3 is a plan view of the insulation case 190 in FIG. 2, and FIG. 4 is a sectional view of the assembled cap assembly and the insulation case 190 of FIG. 2.

Referring to FIG. 2, the insulation case 190 includes a first recess 192 that receives at least a portion of the lower projected part of the cap assembly 100, as defined below. The first recess 192 can have a shape that is complementary to shape of the lower projected part of the cap assembly 100.

The term "lower projected part of the cap assembly 100" refers to a part of the cap assembly 100 that projects lower than the lowest face of the cap plate 110. The shown lower projected part includes the insulation plate 140, the terminal plate 150, the lower end of the electrode terminal 130. According to the present embodiment, the portion of the lower projected part of the cap assembly 100 that is received in the first recess 192 includes the lower part of the electrode terminal 130 and a first portion of the terminal plate 150. However, it is to be understood that the first recess 192 could also receive all or a portion of the insulation portion 140.

The insulation case 190 may be made of any suitable insulating material such as, for example, PP (polypropylene) and may be formed by any known process such as, for example, injection molding.

More particularly, the insulation case 190 includes a plate portion 191 that forms its base and a side wall 199 extending upwardly at the edge of the plate 191. The first recess 192 is formed on the upper face of the plate 191. While not required in all aspects, the insulation case also includes a slot 197 through which the first electrode tab 17 passes, a side groove 198 formed on the side of the plate through which the second electrode tab 16 passes, a hole (not labeled) through which injected electrolytic solution from the feeding hole 112 enters into the battery can 11, and a hole (not labeled) through which gas generated inside the battery escapes to the vent 116.

As shown in FIG. 4, the lower end 131 of the electrode terminal 130 and a first portion 151 of the terminal plate 150 are received in the first recess 192. As shown, the first recess 192 has a stepped configuration such that the upper step 192a of the first recess 192 receives the first portion 151 of the terminal plate 150 and the lower step 192b of the first recess 192 receives the lower end 131 of the electrode terminal 130. The upper step 192a of the first recess 192 can have a shape that is complementary with the shape of the first portion 151 of the terminal plate 150.

For example, if the thickness of the plate portion 191 of the insulation case 190 is 0.6 mm, a the upper step 192a of the first recess 192 may have a depth of about 0.2 mm and the lower step 192b of the first recess 192 may have a depth of about 0.1 mm beyond the depth of the upper step 192a. As a result thereof, the maximum depth of the first recess 192 may be about 0.3 mm. In comparison with this embodiment, in the case where the a recess in the insulation case is not stepped and has a depth of about 0.2 mm, the effect for preventing deformation is excellent but the capacity of the battery is less. In the case where the a recess in the insulation case is not stepped and has a depth of about 0.3 mm without a stepped part, the capacity of the battery may be increased but there is a danger of deformation of the plate 191. However, it is to be understood that the stepped recess need not be used in all aspects.

Therefore, it is possible to accomplish both the effect of preventing deformation of the insulation case and the effect of increasing the capacity of the battery simultaneously by forming the first recess 192 in a stepped configuration, as shown. In addition, the lower projected part of the cap assembly 100 and the insulation case 190 have a complimentary shape with each other so that the contact surface between them is greater. Therefore, the danger of fluctuation or deformation if the battery is dropped or subjected to external vibration is decreased.

Further, a first seat recess 117 is formed on the lower face of the cap plate 110 to seat an upper part of the insulation plate 140 and a second seat recess 147 is formed on the lower face of the insulation plate 140 at a location aligning or corresponding with the location of the first seat recess 117 to seat a second portion 152 of the terminal plate 150.

It is desirable to provide a space for locating the first electrode tab 17 between the upper face of the plate 191 of the insulation case 190 and the lower face the terminal plate 150. However, it is also desirable to decrease the space between the terminal plate 150 and the insulation case 190 in order to increase the capacity of the battery. Therefore, to satisfy these two demands, the first seat recess 117 and the second seat recess 147 are formed above the second portion 152 of the terminal plate 150, which is where the first electrode tab 17 contacts the terminal plate 150 and at which the tab 17 is welded to the terminal plate 150.

In addition, the interlocking structure of the cap assembly 100 and insulation case 100 as described herein is effective for preventing a short circuit between the cap plate 110 and the terminal plate 150 by preventing the insulation plate 140 from rotating with the terminal plate 150. Such rotating may occur, for example, when end of the electrode terminal 130 is inserted into the cap assembly 100 and pressed while spinning.

A space is formed between the second portion 152 of the terminal plate 150 and the upper face of the plate portion 191 of the insulation case 190. The first electrode tab 17 that extends from a first electrode 15 of the electrode assembly 12 and passes through the slot 197 formed in the plate portion 191 extends into the space between the second portion of the terminal plate 150 and the plate portion 191 of the insulation case 190 and is welded to the lower face of the terminal plate 150. The first electrode tab 17 may be installed by welding to the lower face of the terminal plate 150 in a serpentine type or Z-type configuration. However, it is to be understood that other mechanisms can be used to electrically connect the tab 17 and the terminal plate 150 in addition to or instead of welding.

The space where the first electrode tab 17 is located is formed by providing a second recess 193 in the upper face of the insulating case 190. Accordingly, the insulation case 190 and the cap assembly 100 may be more closely contacted to each other so as to increase the capacity size of the battery 10.

In addition, on the opposite side of the electrode terminal 130 from where the first seat recess 192 is formed, a space is provided between the lower face of the cap plate 110 and the upper face of the plate 191 of the insulation case 190. The second electrode tab 16 extends from a second electrode 13 of the electrode assembly 12, passes through the hole or side groove 198 formed in the plate 191 and is welded to the lower face of the cap plate 110.

While not required in all aspects, the upper face of the side wall 199 of the insulation case 190 is shown to contact with the lower face of the cap plate 110 so as to maximize the capacity size of the battery by eliminating unnecessary space between the cap assembly 100 and the insulation case 190. The height of the side wall 199 of the insulation case 190 may be determined by considering the space needed for installing the first electrode tab 17 and the second electrode tab 16, particularly, considering the depth of the second recess 193 formed in the plate 191 of the insulation case 190 when considered with the space needed for mounting the first electrode tab 17.

Figure 5:
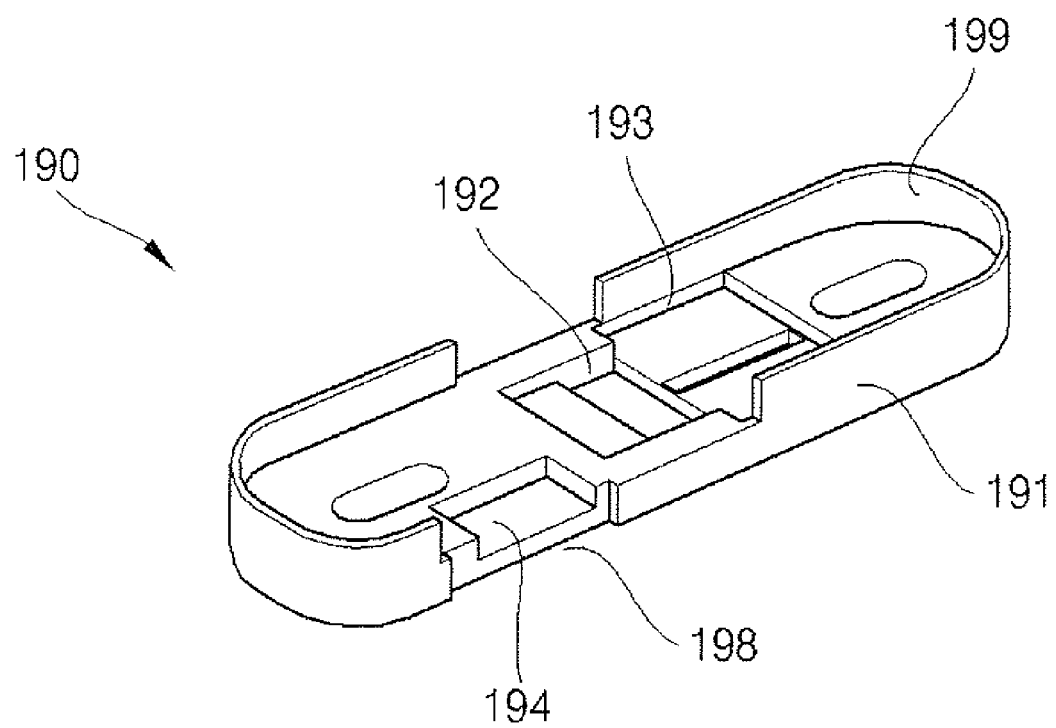
FIG. 5 is a perspective view illustrating an insulation case of the secondary battery according to another embodiment of the present invention.

According to another embodiment of the present invention shown in FIG. 5 in conjunction with FIGS. 1 to 4, there is provided a secondary battery 10 that includes an electrode assembly 12 including first and second electrodes 13,15, first and second electrode tabs 17,16 extending from the first and second electrodes and a separator 14 interposed between the two electrodes 13, 15; a can 11 that contains the electrode assembly 12; and a cap assembly 100 including a cap plate 110 connected to the upper part of the can 11 and provided with a terminal hole 11, an electrode terminal 130 installed through the terminal hole 111 and provided with a gasket 120 located on its outer face that insulates the electrode terminal 130 from the cap plate 110, a terminal plate 140 installed below the cap plate 110 and connected to the lower end of the electrode terminal 130 and an insulation plate 140 installed between the cap plate 110 and the terminal plate 150. The secondary battery 10 further includes an insulation case 190 installed between the electrode assembly and the cap assembly, The insulation case 190 includes a slot 197 through which the first electrode tab 17 passes and a side recess 198 through which the second electrode tab 16 passes, a first recess 192 that receives a lower end 131 of the electrode terminal 130 and a first portion of the insulation plate 140, a second recess 193 that provides a space that receives the first electrode tab 17, the first electrode tab 17 being welded to the lower face of the terminal plate 150, and a third recess 194 that provides a space that receives the second electrode tab 16, the second electrode tab 16 being welded to the lower face of the cap plate 110 as shown in FIG. 5. In this example, other features except for the third recess 194 are the same as in the insulation case 190 according to the example in FIG. 2, and the drawing reference numerals for the same elements in FIG. 2 have been omitted in this example.

In this embodiment, the upper face of the insulation case may be in contact with the lower face of the cap plate.

In this embodiment, the first recess, the second recess and the third recess are formed to ensure that there is adequate space between the cap assembly 100 and the insulation case 190 for the first electrode tab 17 and the second electrode tab 16. A hole for through which the electrolytic solution is injected and a vent through which gas generated inside the battery during the operation of the battery passes may be further formed in the insulation case.

The secondary battery according to aspects of the present invention produces, among others, the following effect. Deformation of the insulation case is prevented by providing a thick insulation case, and unnecessary space between the cap assembly and the insulation case is minimized by forming the recess that can receive at least a part of a cap assembly in the insulation case, thereby allowing the battery capacity to be maximized or the size of the battery to be miniaturized.

While described in the context of a rechargeable battery using a liquid electrolyte, it is to be understood that aspects can be used in non-rechargeable batteries, in secondary batteries using solid and/or gel electrolytes, and that other materials can be used for the cathode and/or the anode.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery comprising:
   an electrode assembly including a first electrode and a second electrode and a separator interposed between the first electrode and the second electrode;
   a can that contains the electrode assembly and that has a closed end and an open end;
   a cap assembly connected to the open end of the can, the cap assembly including a lower projected part facing the electrode assembly; and
   an insulation case between the electrode assembly and the cap assembly, wherein the insulation case includes a first recess that receives at least a portion of the lower projected part of the cap assembly.

2. The secondary battery of claim 1, wherein the insulation case comprises a plate portion forming a base and a side wall that extends upwardly at the edge of the plate portion away from the electrode assembly, and wherein the first recess is formed on the upper face of the plate portion.

3. The secondary battery of claim 2, wherein the cap assembly comprises a cap plate connected to the upper part of the can and provided with a terminal hole, an electrode terminal installed through the terminal hole and having a gasket located on its outer face that insulates the electrode terminal from the cap plate, a terminal plate installed below the cap plate and connected to a lower end of the electrode terminal and an insulation plate installed between the cap plate and the terminal plate, and wherein the lower projected part of the cap plate received in the first recess is a lower end of the electrode terminal and a first portion of the terminal plate.

4. The secondary battery of claim 3, wherein the inside of the first recess is stepped to have an upper step and a lower step and wherein the upper step of the first recess receives the first portion of the terminal plate and the lower step of the first recess receives the lower end of the electrode terminal.

5. The secondary battery of claim 3, wherein:
a lower face of the cap plate includes a first seat recess that seats a first portion of the insulation plate, and
a lower face of the insulation plate includes a second seat recess that seats a second portion of the terminal plate and wherein the second seat recess aligns with the first seat recess.

6. The secondary battery of claim 5, wherein:
a space is provided between the second portion of the terminal plate seated in the second seat recess and the upper face of the plate portion of the insulation case,
a first electrode tab extends from the first electrode of the electrode assembly, wherein the insulation case includes a slot,
the first electrode tab passes through the slot in the plate portion of the insulation case and extends into the space provided between the insulation case and the second portion of the terminal plate and
the first electrode tab is welded to a lower face of the terminal plate.

7. The secondary battery of claim 6, wherein the upper face of the insulation case includes a second recess that provides the space between the second portion of the terminal plate and the upper face of the plate portion of insulation case into which the first electrode tab extends.

8. The secondary battery of claim 5, wherein:
a space is provided between the lower face of the cap plate and the upper face of the plate portion of the insulation case,
a second electrode tab extends from the second electrode of the electrode assembly,
the insulation case includes a side recess, wherein the second electrode tab passes through the side recess of the insulation case and extends into the space provided between the lower face of the cap plate and the upper face of the plate portion of the insulation case, and
the second electrode tab is welded to the lower face of the cap plate.

9. The secondary battery of claim 2, wherein the upper face of the side wall of the insulation case contacts the lower face of the cap plate.

* * * * *